United States Patent
Cao et al.

(10) Patent No.: US 11,207,845 B2
(45) Date of Patent: Dec. 28, 2021

(54) INDUCTIVE THERMO-CRIMPING APPARATUS

(71) Applicant: Shanghai Joulead Electric Co., Ltd, Shanghai (CN)

(72) Inventors: Jintai Cao, Shanghai (CN); Fei Lu, Shanghai (CN); Shengjie Mo, Shanghai (CN)

(73) Assignee: SHANGHAI JOULEAD ELECTRIC CO., LTD, Shanghai (CN)

( * ) Notice: Subject to any disclaimer, the term of this patent is extended or adjusted under 35 U.S.C. 154(b) by 66 days.

(21) Appl. No.: 16/616,885

(22) PCT Filed: Jul. 2, 2019

(86) PCT No.: PCT/CN2019/094361
§ 371 (c)(1),
(2) Date: Nov. 25, 2019

(87) PCT Pub. No.: WO2020/007285
PCT Pub. Date: Jan. 9, 2020

(65) Prior Publication Data
US 2020/0353693 A1    Nov. 12, 2020

(30) Foreign Application Priority Data

Jul. 6, 2018 (CN) .......................... 201810737096.8
Jul. 6, 2018 (CN) .......................... 201821067918.8

(51) Int. Cl.
*B29C 65/46* (2006.01)
*B29C 65/20* (2006.01)
*H01R 43/048* (2006.01)

(52) U.S. Cl.
CPC .............. *B29C 65/46* (2013.01); *B29C 65/20* (2013.01); *H01R 43/048* (2013.01)

(58) Field of Classification Search
CPC .......... B29C 65/32; B29C 65/36–3696; B29C 65/46; H01R 43/048–0585; H01R 4/18;
(Continued)

(56) References Cited

U.S. PATENT DOCUMENTS

2005/0034505 A1*  2/2005  Imai ................... H01R 43/0488
                                                             72/481.1

FOREIGN PATENT DOCUMENTS

DE        102017006126 A1 * 12/2017   ......... H01R 43/0207

OTHER PUBLICATIONS

Machine translation of DE 102017006126 date unknown.*

* cited by examiner

*Primary Examiner* — John L Goff, II
(74) *Attorney, Agent, or Firm* — Muncy, Geissler, Olds & Lowe, P.C.

(57) ABSTRACT

An inductive thermo-crimping apparatus is provided, which is provided for crimping a crimping body which is formed by the contact of the connecting body and the to-be-joined member. The inductive thermo-crimping apparatus includes a driving part, a stamper part, and a heating part, the driving part is connected to the stamper part, and the heating part is fixedly connected to the driving part. After the heating part is activated, the crimping body is disposed on the heating part. The heating part includes an inductive heating coil. The inductive heating coil surrounds in the heating part. The inductive heating coil is provided for heating the crimping body to soften the crimping body, in which the driving part is provided for driving the stamper part to press the soften crimping body, so that the connecting body and the to-be-joined member is crimped and to form a rigid crimping body after cooling. The present invention utilizes the coil with an alternative current to heat the crimping body by an electro- (Continued)

magnetic induction, so that the process of the crimping technology is convenient and fast.

18 Claims, 10 Drawing Sheets

(58) Field of Classification Search
CPC ..... H01R 4/187; H01L 21/67144; H05B 6/14; B23K 20/00; B23K 20/004
See application file for complete search history.

INDUCTIVE THERMO-CRIMPING APPARATUS

CROSS-REFERENCE TO RELATED APPLICATIONS

This application claims the benefit of PCT/CN 2019/094361, filed on Jul. 2, 2019, the content of which are hereby incorporated by reference in their entirety.

FIELD OF THE INVENTION

The present invention is to provide an inductive thermo-crimping apparatus, more particularly a thermo-crimping apparatus of utilizing the induced Eddy current to heat a workpiece.

BACKGROUND OF THE INVENTION

The fusing technology is prevalent in the connecting process of the conducting wire. Please refer to FIG. 1A and FIG. 1B of the fusing technology in the prior arts. FIG. 1A illustrates a top view of two insulating electric wires 10 and 20. The insulating electric wire 10 has one or more copper wires 11 and an insulating layer 13 which covers the copper wires 11. Next, please together refer to FIG. 1A and FIG. 1B. FIG. 1B illustrates the side view of the fusing apparatus and the insulating electric wires, while the insulating electric wire is performed by the fusing technology. The fusing apparatus 30 includes an indenter 31 and a base 33, wherein the indenter 31 is composed of metal and the indenter 31 is used to connect with the power supply 40. The base 33 is manufactured by metal and the base 33 includes a groove 32. The indenter 31 and base 33 further include an electric heating filament (not shown in FIG. 1B), the heating filament is used to generate heat after the current is turned on. The predetermined joint surface 12 of one or more insulating electric wires 10 is contacted to the joint surface 21 of the insulating electric wire 20 to put into the groove 32 of the fusing apparatus 30 to form a workpiece F which is to be processed. Then, the power supply 40 is turned on, and the workpiece F to be processed, which is electrically connected to the indenter 31, is to be processed, and the indenter 31 is moved toward −Y direction (as shown in FIG. 1A) until the indenter 31 is crimped to the workpiece F to be processed tightly. Accordingly, the power supply 40, the indenter 31, the workpiece F to be processed, and the base 33 form a circuit loop. Next, the electric heating filament (not shown in FIG. 1B) in the indenter 31 and the base 33 will generate the heat to increase the temperature of the workpiece F to be processed. The heat is generated by the contact insulating electric wire 10 and insulating electric wire 20 and the pressure generated by the indenter 31 will melt the insulating layer 13 of the workpiece F to be processed, so as to the workpiece F is to be soften. At this time, the workpiece F is to be processed which is pressed by the indenter 31 into one. After the fusing process is completed, the indenter 31 is moved toward the +Y direction. The workpiece F to be processed is cooled in an ambient condition of room temperature. The melted insulating layer 13 of the workpiece F to be processed is cooled and the shape is determined. The termination of the two insulating electric wires 10 and 20 is completed.

However, the existing fusing technology has the following problems: the fusing technology needs a higher current, but the higher current may easily make the indenter 31 oxidized. In addition, the high pressure contact with the indenter 31 and the workpiece F to be processed over a long period of time tends to damage the indenter 31, so the indenter 31 needs to be replaced frequently. Also, a long-term use of indenter 31 may leave stain, and the stain will cause the power supply 40 to be unstable, and the power supply 40 is easily damaged. Moreover, the existing fusing apparatus needs a large current of 1000 A (amp) or more. It not only consumes electricity, but also has a small resistance of the indenter 31, resulting in the low overall electric energy and heat energy conversion efficiency and waste of a lot of energy. Furthermore, when using the existing fusing apparatus, it is needed to continuously squeezed the workpiece F to be processed to ensure that the contact between the indenter 31 and the workpiece F to be processed is good and the circuit is connected. Thus, the workpiece F to be processed is heated without deformation cannot be achieved. Therefore, the size of the workpiece is difficult to be controlled after the fusing technology is completed. It is obvious that the existing fusion technology is only applicable to the manual work situation, and it is more difficult to apply to the automated work situation. Additionally, the existing fusing apparatus will generate impurities melted from the insulating layer 13 into the circuit. The impurity seriously affects the rate of the temperature rise and decrease conversion efficiency of the overall electrical energy and heat energy, thereby affecting the fusion welding quality. Also, if the impurity is scratched out by a manual method before the fusing technology is performed, it will increase the production cost.

SUMMARY OF THE INVENTION

In order to improve the disadvantages of the prior art, the object of the present invention is to provide an inductive thermo-crimping apparatus applied for crimping a workpiece which is formed by the contact of a connecting body and a to-be-joined member. The inductive thermo-crimping apparatus includes a driving part, a stamper part and a heating part. The driving part is connected to the stamper part. The heating part is fixedly connected to the driving part. The heating part is electrically activated. The crimping body is disposed on the heating part. The heating part includes an inductive heating coil which surrounds in the heating part. The inductive heating coil is provided for heating the crimping body to soften the crimping body. The driving part is provided for driving the stamper part to press the crimping body. Therefore, the connecting body is crimped into the to-be-joined member to form a rigid workpiece after the cooling process. In this invention, the connecting body is a cable and the to-be-joined member is a wire nose.

Preferably, the driving part is provided for driving the stamper part to move toward a first direction, a second or a third direction.

Preferably, the stamper part includes a slide block, a punch fixation device, a punch and a guide rail, wherein the slide block is disposed in the guide rail, the guide rail is disposed in parallel with the third direction, and the material of the punch is selected from the group consisting of cooper alloy, stainless steel, ceramics or the combination thereof.

Preferably, the heating part further includes a concave mold and a magnetic conductor, wherein the concave mold is disposed on the magnetic conductor, the magnetic conductor is disposed on the inductive heating coil and surrounding the outside of the concave mold. The projection shape of the inductive heating coil on the first plane is an arc shape or a saddle shape.

Preferably, on the third plane, the inductive heating coil is provided for surrounding the concave mold.

As mentioned above, the inductive thermo-crimping apparatus of the present invention does not need to utilize the upper electrode and the lower electrode to contact the crimping body to heat the crimping body. The crimping body is heated only by electromagnetic induction through a coil with the current. Neither does the current need to pass through the indenter, nor does it require the use of electrodes, so that the damage of the indenter and the cost of the additional electrode can be reduced. In addition, through a proper magnetic circuit design and an electronic control system, the heating may be uniform. More importantly, it is not necessary to manually scrape the surface of the crimping body and the insulating material of the conductive wire, to greatly increase the capacity of the inductive thermo-crimping apparatus. With the movable and rotating punch, the pressing quality of the crimping body becomes much better. Based on the above reasons, the inductive thermo-crimping apparatus is very competitive in the processing industry

DETAILED DESCRIPTION OF THE PREFERRED EMBODIMENT

In order to provide a better understanding for the object, characteristics and advantages of the present invention to persons skilled in art and thus to embody the present invention, the accompanying drawings, embodiments provided to demonstrate the characteristics of the present invention and preferred embodiments serve to provide a further explanation. The accompanying drawings serve to express the illustrations for the characteristics of the present invention, so it is not needed to draw precisely. The embodiments regarding the technical content which is well-known by the technical persons in the related field may not be described in the specification as well.

In the present invention, X axis, Y axis and Z axis are the right-handed Cartesian coordinate system. In the present invention, the directions of X axis, Y axis and Z axis and origin are illustrated according to each figure, wherein the direction of X axis is the first direction, the direction of Y axis is the second direction and the direction of Z-axis is the third direction. Further, the Y-Z plane is defined as the first plane, the X-Z plane is defined as the second plane, and the X-Y plane is defined as the third plane.

Figure 1A:
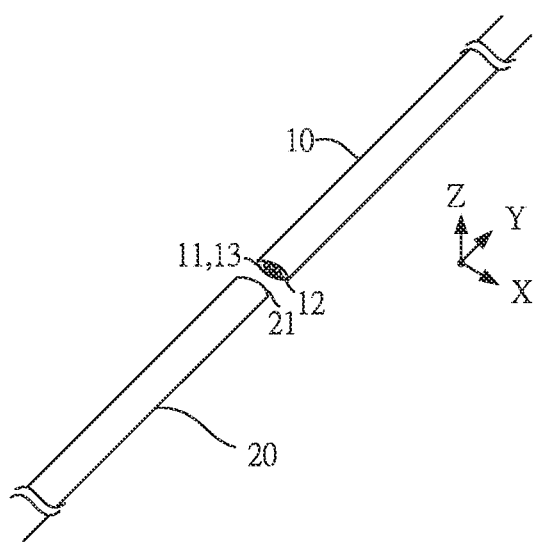
FIG. 1A is an oblique view of the two insulting wires before the existing fusing technology is carried out in accordance with the conventional prior art.
Figure 1B:
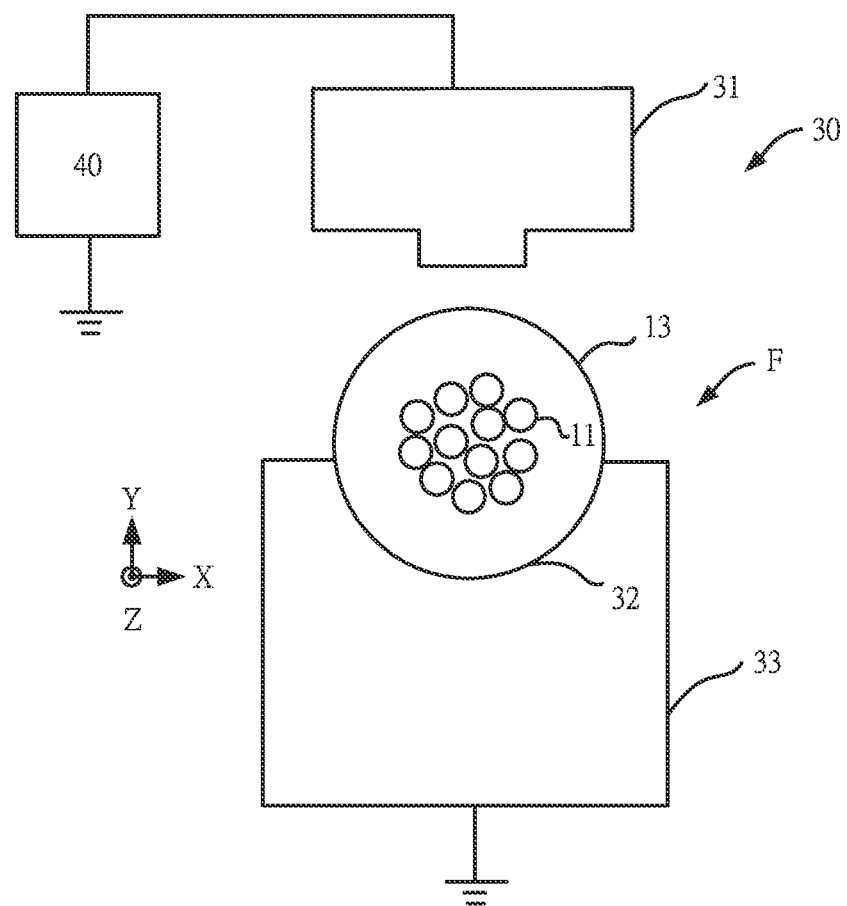
FIG. 1B is a side view of the fusing apparatus and the insulating wires on the X-Y plane when the existing fusing technology is carried out in accordance with the conventional prior art.
Figure 2:
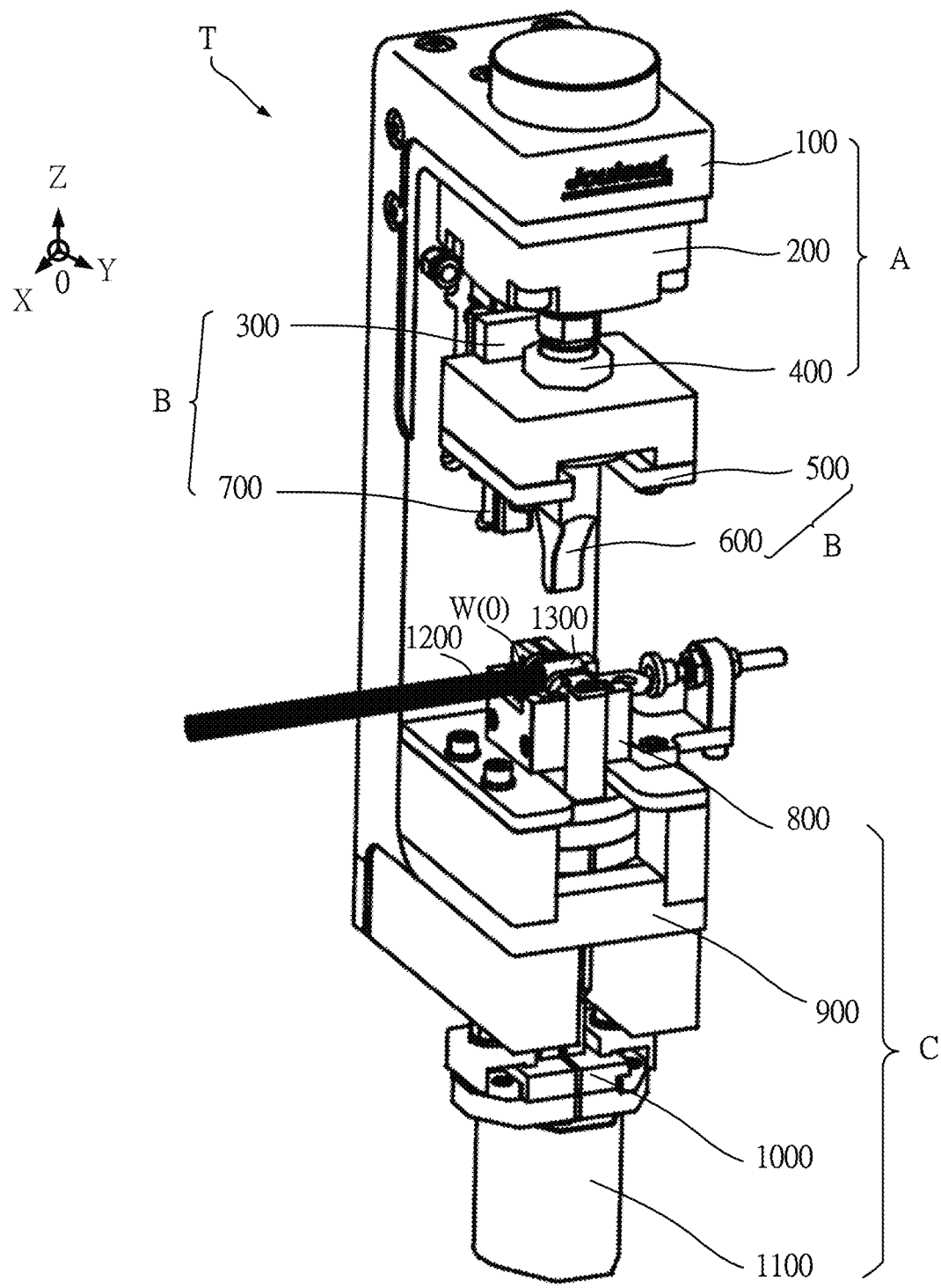
FIG. 2 is an oblique view of the thermo-crimping apparatus in accordance with the technique of the present invention.
Figure 4:
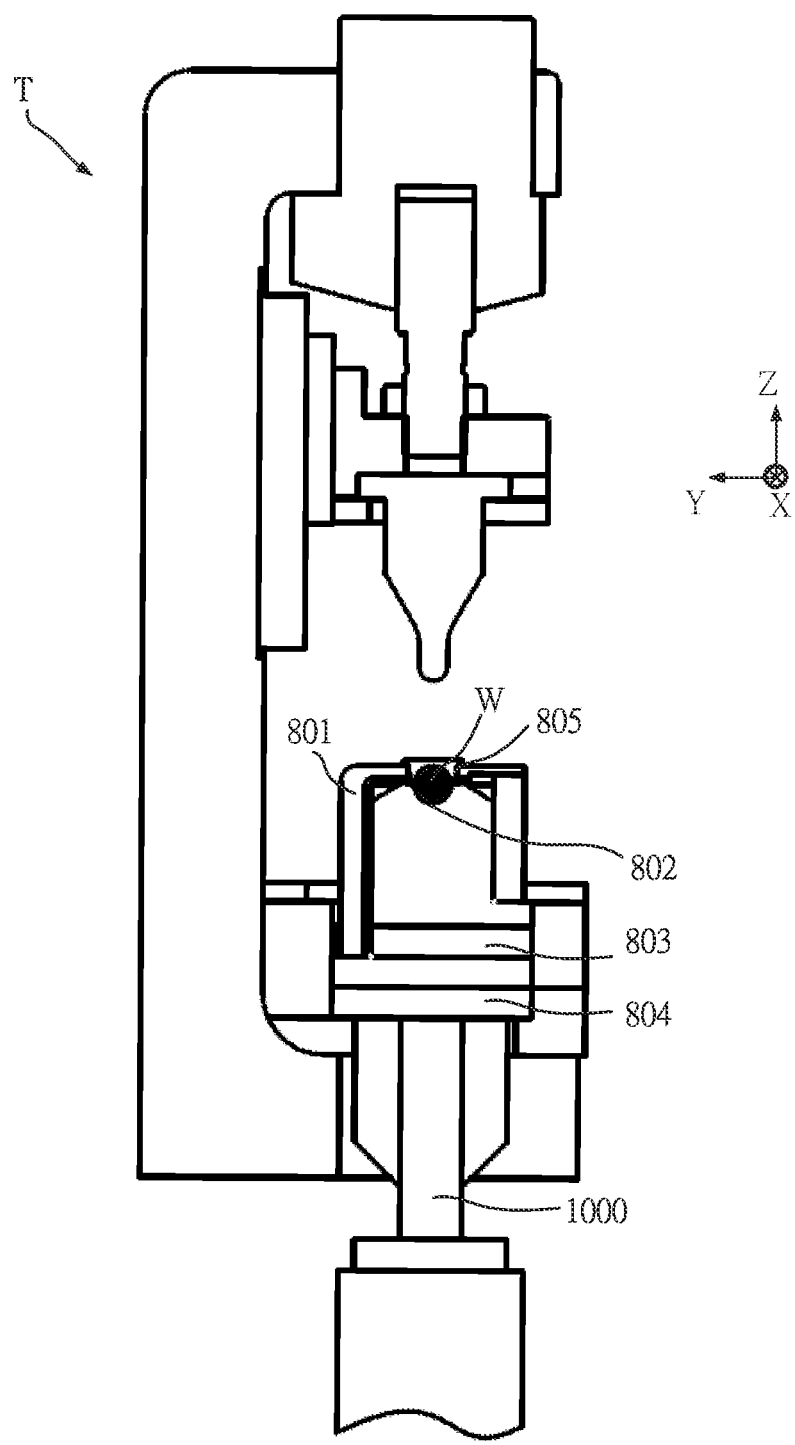
FIG. 4 is a side view of the thermo-crimping apparatus on the first plane in accordance with the technique of the present invention.

First, please refer to FIG. 2. FIG. 2 illustrates an oblique view of the inductive thermo-crimping apparatus T. The inductive thermo-crimping apparatus T includes a driving part A, a stamper part B, and a heating part C, wherein the driving part A and stamper part B are connected. The driving part A may be electrically connected to a driving chip, a control device (not shown in FIG. 2), or a mechanical pivoting operation lever through an exterior power supply for operating. The method for connecting the driving part A and the stamper part B includes an electrical connection, a mechanical connection, a liquid hydraulic connection or an oil hydraulic connection. The most preferred method is oil hydraulic connection to allow the driving part A to drive the stamper part B mechanically, electrically, or in a cylinder. The heating part C includes an inductive heating coil 801 and a concave mold 802 (as shown in FIG. 4). When the inductive heating coil 810 is energized, a magnetic field will be generated. The heating part C can bear the crimping body W. In the coordinate system composed of the inductive thermo-crimping apparatus T, the zero point (origin) is defined as the center of mass of the crimping body W. When the crimping process is performed, two objects are disposed on the heating part C to contact each other to form the crimping body W. Then, the crimping body W is to be heated and to crimp the crimping body W. After the crimping body W is cooling down, the workpiece is finished and the crimping process is also completed. The two objects are the connecting body and the to-be-joined member, respectively. In one embodiment, the connecting body may be the cable 1200 as shown in FIG. 2, and the to-be-joined member may be the wire nose 1300. The crimping body W includes a crimping point W1, wherein the crimping point W1 is the contacting point while the connecting body and the to-be-joined member are contact each other. Next, the crimping point W1 of the crimping body W is placed into the heating part C. The heating part C is energized through an alternative current to generate an alternative magnetic field. When the alternative magnetic field passes through the workpiece, the inductive current will be induced in the workpiece. The current generates the heats, so that the workpiece is to be heated. After a few seconds, the crimping body W with the crimping point W1 will be soften. Later, the driving part A can be driven by a manual way or by an automated way to move the stamper part B on the third direction and to press on the crimping point W1 of the crimping body W to perform the crimping process for the crimping point W1 of the crimping body W. After the crimping process is carried out, the alternative current which is passed through the heating part C is turned off, and the stamper part B is driven to move away from the crimping body W on the third direction. After the crimping body W with the crimping point W1 is cooled down, the crimping body W is taken out from the heating part C of the thermo-crimping apparatus T. Now, the shape of the crimping body W is fixed, so the connecting body and the to-be-joined member are formed as a rigid workpiece.

Figure 3:
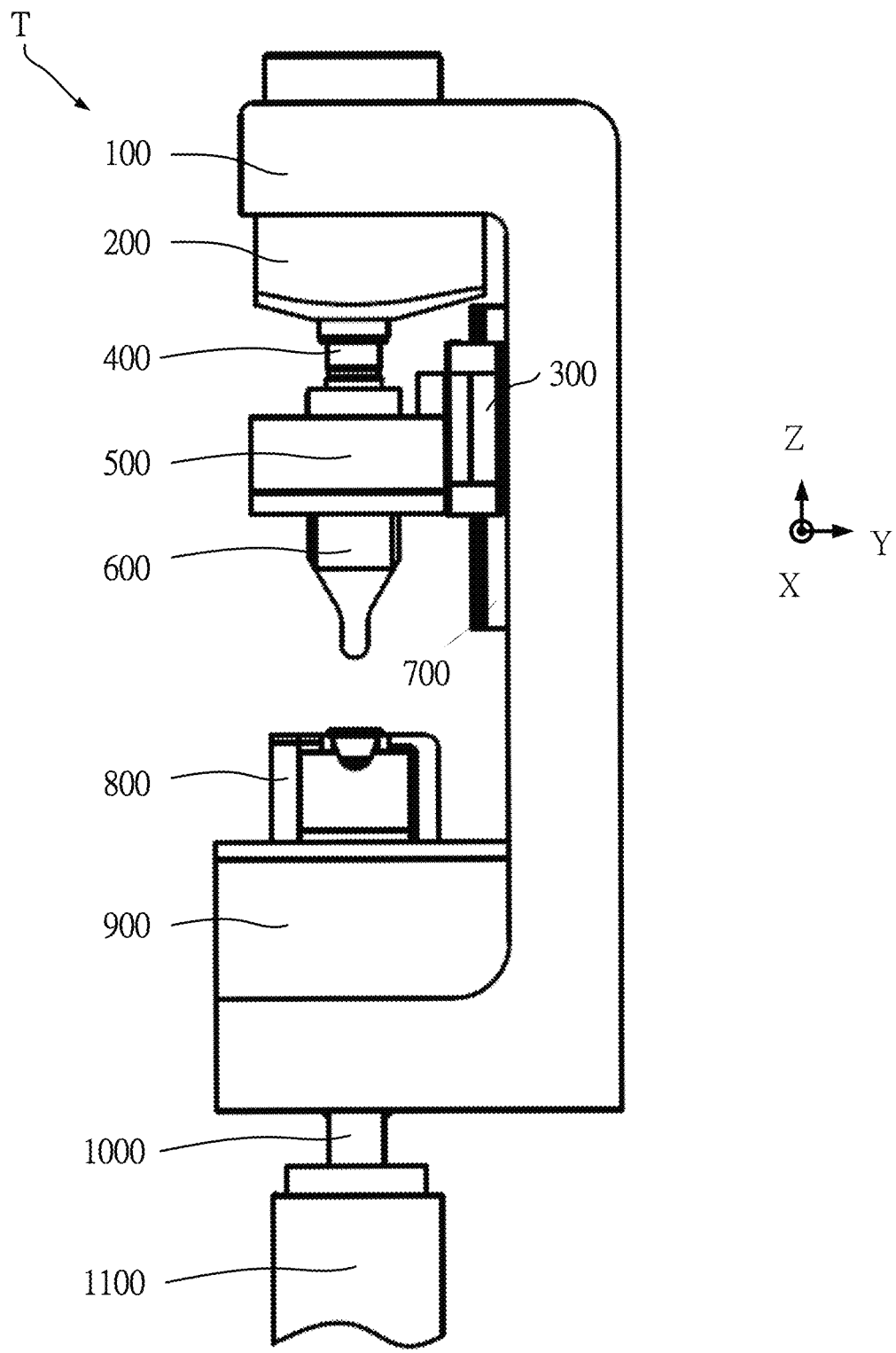
FIG. 3 is a side view of the thermo-crimping apparatus on the first plane in accordance with the technique of the present invention.

Next, the parts for each part of the thermo-crimping apparatus will be specified below. Please refer to FIG. 2 and FIG. 3 together. FIG. 3 is a side view of the inductive thermo-crimping apparatus T on the first plane, wherein the driving part A includes a body 100, an oil cylinder 200 and a set nut 400. The body 100 is the main body of the entire inductive thermo-crimping apparatus T, and the body 100 is made of stainless steel or aluminum, which is used to support and to joint all parts of the inductive thermo-crimping apparatus T. On the first plane, the body 100 is in the shape of a (inverted) C shape. The driving part A, the stamper part B, and heating part C are placed in the gap of the (inverted) C shape. The design of this kind of (inverted) C shape for the body 100 not only saves the volume of the inductive thermo-crimping apparatus T, but more importantly, the design of the (inverted) C shape for the body 100 can make the inductive thermo-crimping apparatus T stabilized on working platform (not shown in FIG. 2 and FIG. 3). The quality of the workpiece formed by the (inverted) C shape is better than that of by the U shape in the prior art, the comparison between the (inverted) C shape and the U shape is shown as in FIG. 8A and FIG. 8B. The oil cylinder 200 is connected to the body 100 and the stamper part B. When the oil cylinder 200 receives the driving signals from an exterior device (not shown in FIG. 2 and FIG. 3), the internal liquid pressure of the oil cylinder 200 is to be changed to drive the stamper part B, such that the stamper part B can perform a reciprocating linear motion on the third direction. The oil cylinder 200 of the present invention may be a piston type, a plunger type or a swing type oil cylinder 200. The type of the oil cylinder 200 is not limited in the present invention. The fixed nut 400 is provided for locking a portion of the oil cylinder 200 so that the oil cylinder 200 does not come off the stamper part B when the oil cylinder 200 is performed reciprocating linear motion. The fixed nut 400 is a well-known hexagonal screw or a round screw.

The inductive thermo-crimping apparatus T further includes a stamper part B. The stamper part B includes a slide block 300, a punch fixation device 500, a punch 600 and a guide rail 700. The slide block 300 and the guide rail 700 are the key components for reciprocating the stamper part B on the third direction. After the slide block 300 is driven by the oil cylinder 200 of the driving part A, the slide block 300 is performed the linear reciprocating motion after. In addition, the reciprocating motion of the slide block 300 is limited to the design of the guide rail 700, since the slide block 300 is installed in the guide rail 700. The stamper part B of the present invention is provided for applying the pressure to the crimping body W which is located below the stamper part B. It is necessary to restrict the direction, in which the slide block 300 reciprocates, to the third direction, so the guide rail 700 is designed to extend on the third direction. Moreover, the projection of the guide rail 700 on the first plane is a straight line parallel to the third direction line. The guide rail 700 is composed of well-known linear slide rails. The number of linear slide rail may be one linear slide rail, or a plurality of linear guide rails to increase the stability of the slide movement. In one embodiment of the present invention, the best design of using the plurality of linear guide rail is disposed on the sidewall near the gap with (inverted) C-shape of the (inverted) C-shape body 100, and each of the plurality of linear guide rails is designed to parallel to the third direction, so that the guide rail 700 can stably reciprocate to increase the processing precision of the crimping body W. The punch fixation device 500 is used for fixing the punch 600. As shown in FIG. 2, the punch fixation device 500 is an inverted U shape, and the punch 600 is disposed on the groove of the U shape. The material of the punch 600 may be metal such as copper alloy, stainless steel, or non-metallic such as ceramic. Obviously, in the embodiment of the present invention, the punch 600 does not need to be energized or heated. Thus, the number of replacements of the punch 600 of the inductive thermo-crimping apparatus T of the present invention is much less than that in the prior art. In the present invention, the main purpose of the punch 600 is to shape the crimping body W after softening at a high-temperature. In addition, the configuration of the punch 600 is required to have a high temperature resistance so that the punch 600 does not melt when the punch 600 comes into the contact with crimping body W with high temperature. In the present invention, the high temperature resistance means that the constituent material does not melt under 1100° C., and the Rockwell hardness is maintained at or above HRC35. The users can transfer the designed pattern to the punch 600 by a well-known production process. In another embodiment of the present invention, the punch fixation device 500 may include a rotatable connector. The term of the rotatable referred to herein is relative to the punch fixation device 500. By using the driving of the external device (not shown in FIG. 2 and FIG. 3), the punch 600 is driven to rotate on the third direction as a rotating shaft, so that the crimping body W can withstand more patterns. In addition, the punch fixation device 500 can also drive the punch 600 on the third plane by the two-layer structure design to enlarge the punch 600 to process the working area of the crimping body W.

Furthermore, the inductive thermo-crimping apparatus T further includes a heating part C. The heating part C has an inductive heating coil component 800, a coil fixation device 900, a transition component 1000 and a cable component 1100. The inductive heating coil component 800 is fixed on the bottom plane of the C shape body 100, and is electrically connected to the cable component 1100 by the transition component 1000. The cable component 1100 can connect to an exterior power supply (not shown in the FIG. 2 and FIG. 3). The inductive heating coil component 800 is energized by the alternative current through the power supply which is provided by the exterior power supply to activate the inductive heating coil component 800 to generate a magnetic field so as to the crimping body W disposed on the heating part C is to be heated inductively and the crimping body W is soften at a high temperature.

Next, please refer to FIG. 4. FIG. 4 illustrates the side view of the inductive thermo-crimping apparatus T on the first plane. FIG. 4 merely shows the components of the heating part C. The inductive heating coil component 800 includes an inductive heating coil 801, a concave mold 802, an insulating plate 803, a coil base 804, and a magnetic conductor 805. Before the processing is performed, the crimping body W is placed in the concave mold 802 of the heating part C. The concave mold 802 presents a U shape, so the U shape can prevent the crimping body W from sliding out of the heating part C during the processing. The concave mold 802 can be made of copper alloy, stainless steel, ceramics or the combinations of above three materials. The inductive heating coil 801 is disposed around the crimping body W and extends on the third direction to contact the coil base 804. In the present invention, the inductive heating coil 801 is a hollow water-cooled coil generally used in the industry, the inductive heating coil 801 is cooled down by an exterior water cooling apparatus (not shown in FIG. 4) to protects the inductive heating coil 801 from overheating and burning during the electromagnetic induction heating, and the exterior water cooling apparatus is also used for cooling the concave mold 802. In another embodiment, the inductive heating coil 801 can also be disposed on a horseshoe-shaped plastic tube (not shown in FIG. 4), and then placed on the coil base 804 to prevent the users from being energized or burned when the inductive heating coil 801 is energized. At this time, the inductive heating coil 800 shown in FIG. 4 is a plastic tube covering the conductive wire. The inductive heating coil 801 is electrically connected to the transition member 1000 through the coil base 804, and is electrically connected to an exterior power supply (not shown in FIG. 4). The inductive heating coil 801 is activated by the exterior power supply. The circuit loop is formed by the inductive heating coil 801 and the exterior power. The area surrounded by the inductive heating coil 801 will generate a circuit loop electromagnetic field. The exterior power supply must be an alternative current to allow the inductive heating coil 801 to generate circuit loop electromagnetic field (that is, to perform the electromagnetic induction), but the alternative current is not limited to a voltage change or a current change. Since the concave mold 802, the coil base 804 and the inductive heating coil 801 may be composed of a conductive material such as metal, in order to prevent the current of the external power supply from flowing directly to the crimping body W via the concave mold 802 to cause the risk of electric shock for user, an insulating plate 803 is designed between the coil base 804 and the concave mold 802 to reduce the chance if leakage occurs and maintains the use safety. In addition, in order to increase the electromagnetic conversion efficiency and prevent the incorrect magnetic flux generated by the inductive heating coil 801 from being leaked out (that is, the magnetic flux is not generated on the third direction), the present invention particularly disposes a magnetic conductor 805 in the heating part C so that the most the magnetic flux can be kept on the third direction. The different shapes and positions of the magnetic conductor 805 may affect the electromagnetic conversion efficiency of the present invention. In the present invention, the magnetic conductor 805 is stacked on the inductive heating coil 801 and arranged into the concave mold 802. Therefore, as shown from FIG. 4, the magnetic conductor 805 is a U shape and closely attached to the sidewall of the concave mold. The magnetic conductor 805 is a cubic block made of magnetic materials, such as iron, cobalt, nickel or a compound of formed by above elements. Using the characteristic of the magnetic field is relatively easy to pass the material with low magnetic resistance, the magnetic generated by the inductive heating coil 801 can be concentrated through the crimping body W. Moreover, the present invention can selectively add an overload protector (not shown) in the coil base 804 to prevent excessive current from passing through the inductive heating coil 801 to cause the burning out of the inductive heating coil 801 and cause danger.

Figure 5A:
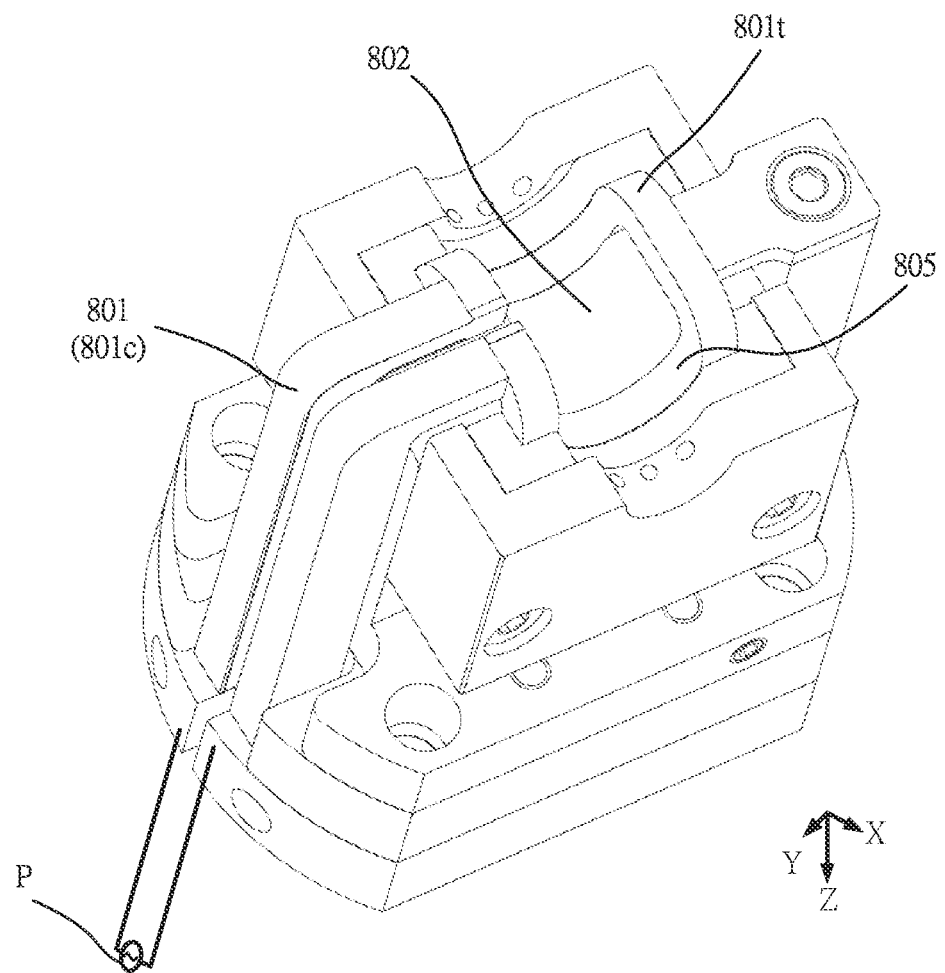
FIG. 5A is a partial oblique view of the thermo-crimping apparatus in accordance with the technique of the present invention.

Next, please refer to FIG. 5A. FIG. 5A illustrates a partial oblique view of the heating part C in the thermo-crimping apparatus T. Here, the heating part C of the thermo-crimping apparatus T is taken out for further explaining the principle and the heating method of the heating part C of the present invention. In FIG. 5A, the inductive heating coil 801 is designed to surround the concave mold 802. The inductive heating coil 801 has a U-shaped portion whose opening area faces the +Y-axis direction, the recess of the concave mold 802 extends on the +Z-axis direction, and the U shape portion surrounds a portion of the recess. When the crimping body W is placed on the concave mold 802, the exterior alternative current (AC) P will apply a current to the inductive heating coil 801, so that the alternative current passes through the inductive heating coil 801. Thus, the inductive heating coil 801 and the external alternative current source P form a circuit loop. According to the principle of electromagnetic induction, the corresponding circuit loop magnetic field is generated in a region surrounded by the circuit loop. In the present invention, since the alternative current source P is an alternative current, the direction and the magnitude of the circuit loop magnetic field change with time. The circuit loop magnetic field is a time-dependent magnetic field. According to the Fleming's right-handed rule, in one embodiment, if the current flows in the +X direction at the coil top 801t, the magnetic field direction is the +Z direction. In another embodiment, if the current is at top 801t of the coil and the magnetic field direction is the −Z direction. Then, the circuit loop magnetic field will pass through the surface of the crimping body W. According to Lenz's law, the time-dependent circuit loop magnetic field (time-dependent magnetic flux density) may induce the crimping body W (which must be a conductive material) to have an inductive potential, and because there is electric resistance on the surface of the criming body W, an Eddy current may be formed In addition, because the surface of the crimping body W has electric resistance, the energy loss occurs when the Eddy current flows on the surface of the crimping body W, and there is energy loss, and this energy is dissipated in the form of heat energy to the entire crimping body W. Therefore, during the energization of the inductive heating coil 801, heat energy is generated by the crimping body 810 due to the electromagnetic induction generated by the inductive heating coil 810.

Figure 5B:
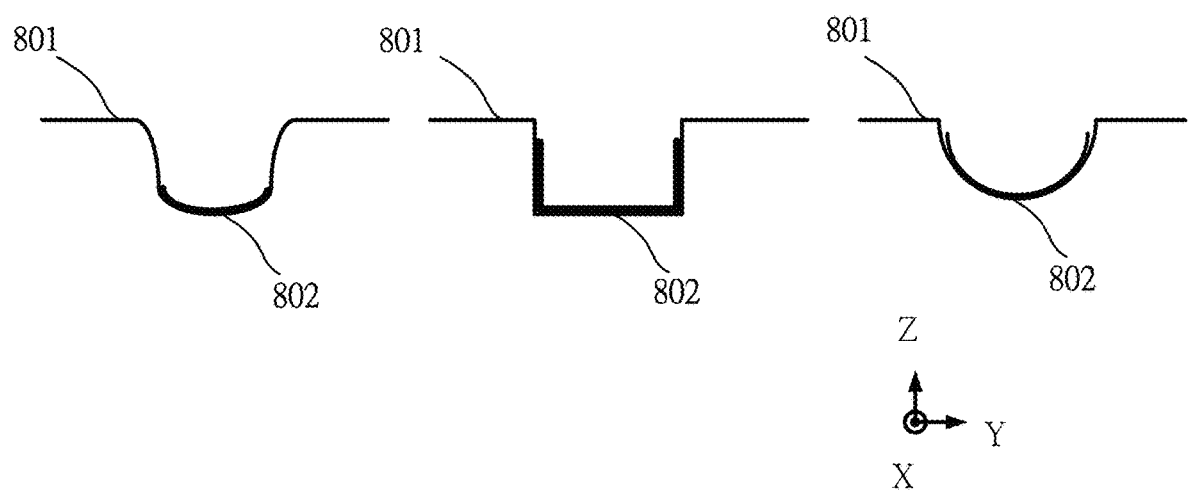
FIG. 5B is a partial side view of the thermo-crimping apparatus on the third plane in accordance with the technique in the present invention.

When the current value of the inductive heating coil 801 is fixed, the temperature generated on the surface of the crimping body W is determined by the material of the crimping body W. For a widely used material, copper alloy, at a value of 1000 A, the temperature of the crimping body W can reach 600-700° C. The material of the inductive heating coil 801 is made of copper wire, which may be a copper wire coil or a multi-turn copper wire coil. Moreover, the frequency or the current value of the alternative current can be automatically adjusted manually using a controller (not shown in FIG. 5A. For example, the controller includes frequency conversion circuit or a current peak control circuit to adjust the heating temperature according to the different crimping body W conditions. Otherwise, the area or the shape of the inductive heating coil 801 around the concave mold 802, for example, to adjust the shape of the inductive heating coil 801 on the first plane, such as the shape of the inductive heating coil 801 is a saddle shape, a square or an arc shape, as shown in FIG. 5B from the left side to the right side. In order to match the inductive heating coil 801, the shape of the concave mold 802 on the first plane must be compatible to the inductive heating coil 801. It can also be a saddle shape, a square or an arc as shown in FIG. 5B from the left side to the right side. Most preferably, the present invention utilizes the design of the arc shape and saddle shape to allow the workpiece to be surrounded by the coil so that the workpiece can receive the magnetic field intact and the workpiece can be heated uniformly. Thus, the electromagnetic induction efficiency of the present invention can be increased and the thermal consumption of the current on the inductive heating coil 801 resulting from internal resistance of the coil can be decreased.

Figure 6:
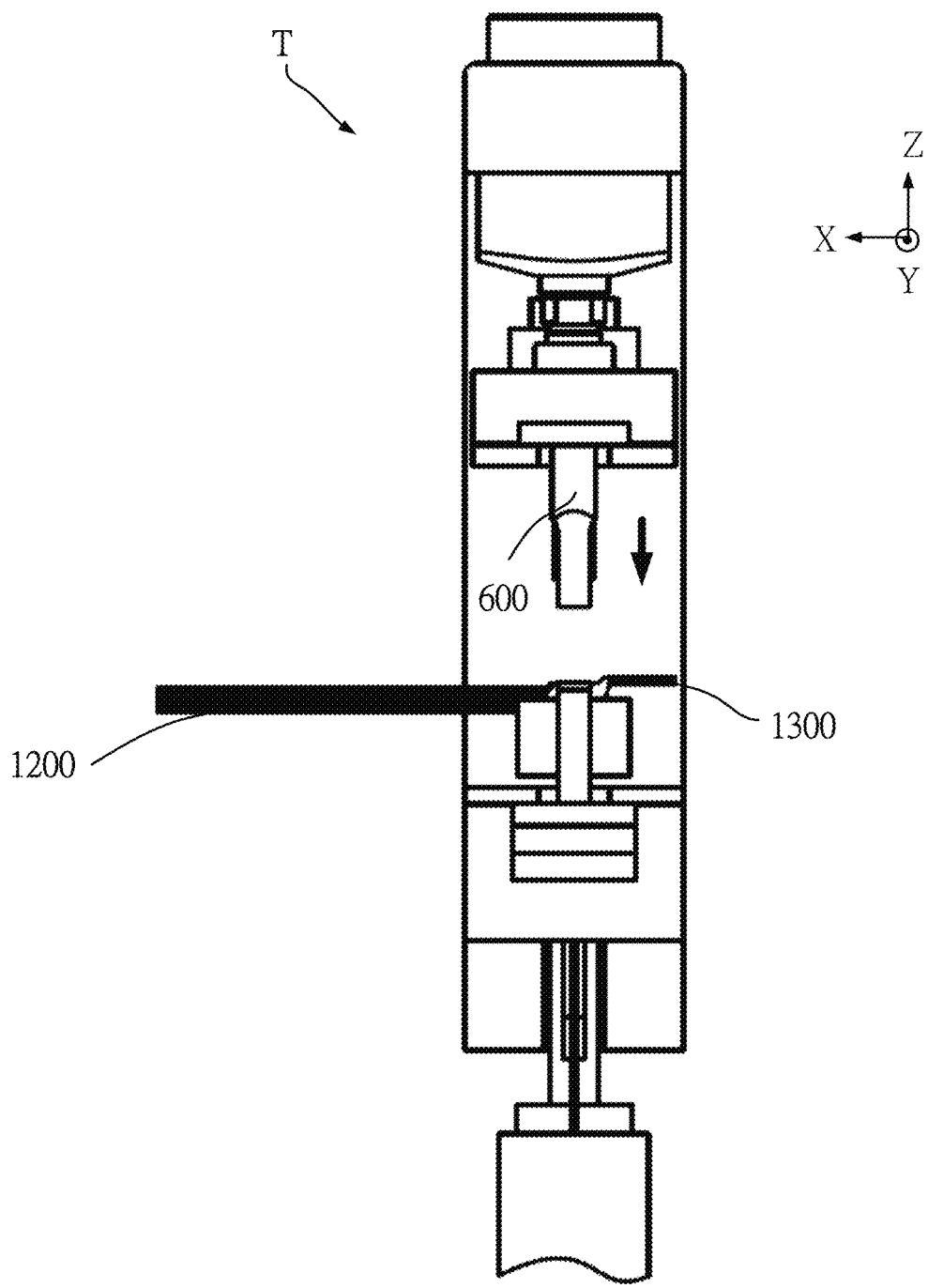
FIG. 6 is a side view of the thermo-crimping apparatus on the second plane in accordance with the technique in the present invention.
Figure 7:
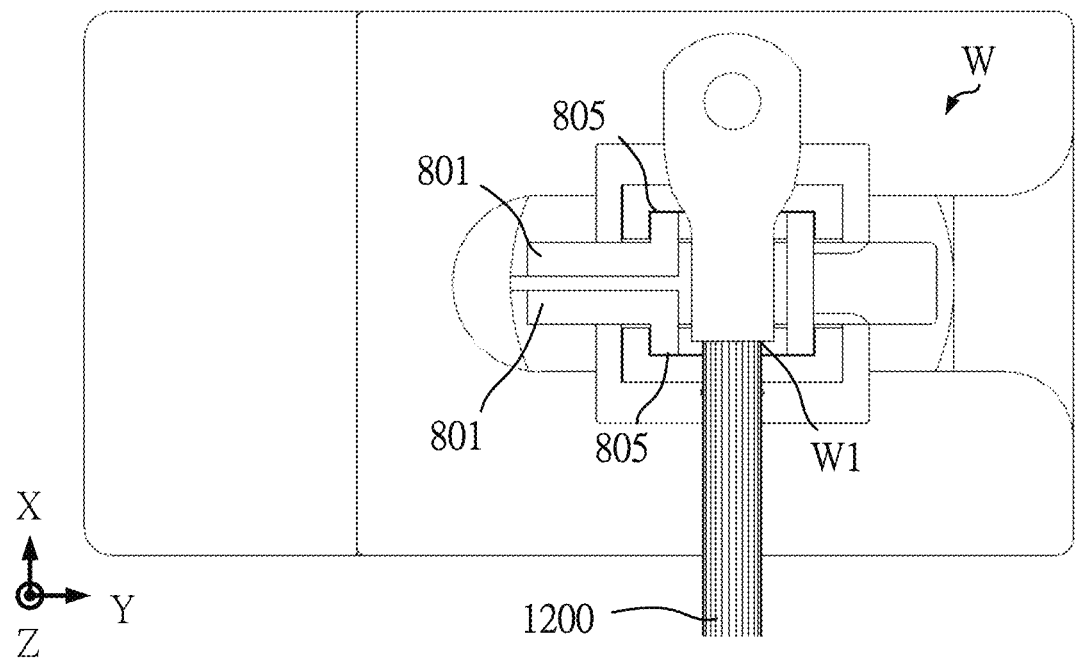
FIG. 7 is a partial side view of the thermo-crimping apparatus on the third plane in accordance with the technique in the present invention.

The crimping process(es) of the inductive thermo-crimping apparatus T is described herein. Please refer to FIG. 6 and FIG. 7 together. FIG. 6 is a side view of the inductive thermo-crimping apparatus T on the second plane and FIG. 7 is a partial view of the inductive thermo-crimping apparatus T on the third plane. First, a connecting body and a to-be-joined member are connected to form the crimping body W. In the present invention, both the connecting body and the to-be-joined member include a conductive substance. In one preferred embodiment, the connecting body is cable 1200, and the to-be-joined member is wire nose 1300. The inner and outer diameters of the cable 1200, materials of the insulating sheath and the material of the cable 1200 are not limited in the present invention. The material of the wire nose 1300 is also not limited herein. Before the cable 1200 is formed into the crimping body W, it is not necessary to scrape or eliminate the insulating layer on the surface of the cable 1200 to expose the conductive material within the cable 1200. Here, the term "contact" means that the surfaces of two objects contact each other and the contact is a temporary contact. When the wire nose 1300 contacts the cable 1200, the crimping body W is formed, and the contact point that contacted is called a crimping point W1. The size of the minimum projection area of the crimping body W on the third plane is 10 mm$^2$ and a maximum projected area of the crimping body W is 95 mm$^2$ The size of the crimping body W is smaller than the projection area of the concave mold 802 on the third plane. After the crimping body W is placed in the concave mold 802, the users can fine-tunes the crimping point W1 to the edge of the concave mold 802 to facilitate subsequent operation of the crimping body W favorably, as shown in FIG. 7. Next, the driving part A is activated, and the oil cylinder 200 drives the punch 600 to move toward the direction of the −Z axis, as the direction of the arrow indicated in FIG. 6, so that the punch 600 presses against the crimping body W. At this time, the pressed surface includes the crimping point W1 of the crimping body W. Obviously, in any embodiments of the present invention, the punch 600 does not equip with any inductive heating coil 801. In the present invention, the main purpose of the punch 600 is to shape the crimping body W which is softened at a high temperature. Thus, the time for the punch 600 to press against the crimping body W which can be selected before the heating by the inductive heating coil 801, that is, the driving device A is driven to contact the crimping body W for the shaping of the crimping body W. Alternatively, the time for the punch 600 to press against the crimping body W that is selected after the crimping body W is heated by the inductive heating coil 801 to soften, and the driving device A drives the crimping body W to be shaped, and the present invention is not limited herein Please continue to refer to FIG. 6 and FIG. 7. The alternative current source P as shown in FIG. 5A is tuned on, and then the heating part C will be activated to heat the crimping body W. After heating for 5-10 seconds, the temperature of the crimping body W can be heated up to 600° C. −700° C., and the crimping body W is soften, that is, the contact point of the cable 1200 and the wire nose 1300 is soften. At this time, the driving part A continuously emits an enhanced voltage signal to increase the pressure of the oil cylinder 200 toward the third plane, and to increase the press force for the crimping body to allow the surface of the crimping body W to be shaped to form the pattern desired by user. In addition, the users can also operate the driving part A to slightly adjust the position of the slide block 300 to slightly adjust the height of the punch 600; or adjust the position of the slide block 300 in the third plane. Moreover, the punch 600 can be rotated on the third direction as the rotating shaft to press the crimping body W into the desired pattern, and the cable 1200 and the wire nose 1300 are tightly joined. When user observes that the crimping body W is soften, the procedure of finely adjusting the pattern of the crimping body W can be manually performed. This procedure is completed within about 10 seconds. This procedure can also be performed by the user using additional automatic control system (not shown in FIG. 6 and FIG. 7) to allow the punch 600 automatically move. Thus, the present invention is more suitable for the large-scale automatic operation than the prior art.

When the procedure of fine-tuning the crimping body W is finished, the cable 1200 is crimped to the wire nose 1300, and a rigid workpiece is formed. Sequentially, the user turns off the alternative current source P, and the heating part C stops heating, and uses the driving part A to drive the oil cylinder 200 to decompress, and the slide block 300 drives the punch 600 to move toward +Z axis direction, so that the punch 600 is away from the workpiece. In addition, the user may turn on an external water cooling system (not shown in both FIG. 6 and FIG. 7) to allow the water cooling system to cool the concave mold 802 and also cool the workpiece, so as to speed up the cooling time. After the punch 600 moves away from the workpiece, the surface temperature of the workpiece is cooled down to the room temperature in 10 minutes, the user can take out the workpiece from the inductive thermo-crimping apparatus T. The user can also directly remove the workpiece without long time waiting, so the working cycle can be accelerated.

Figure 8A:
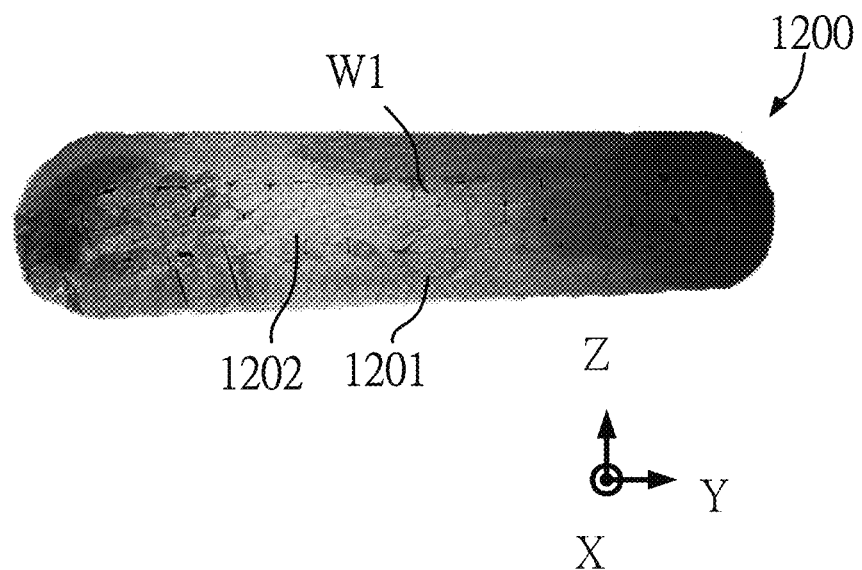
FIG. 8A is a sectional view of the crimping point of the crimping body on the first plane, after the thermo-crimping process using the conventional apparatus
Figure 8B:
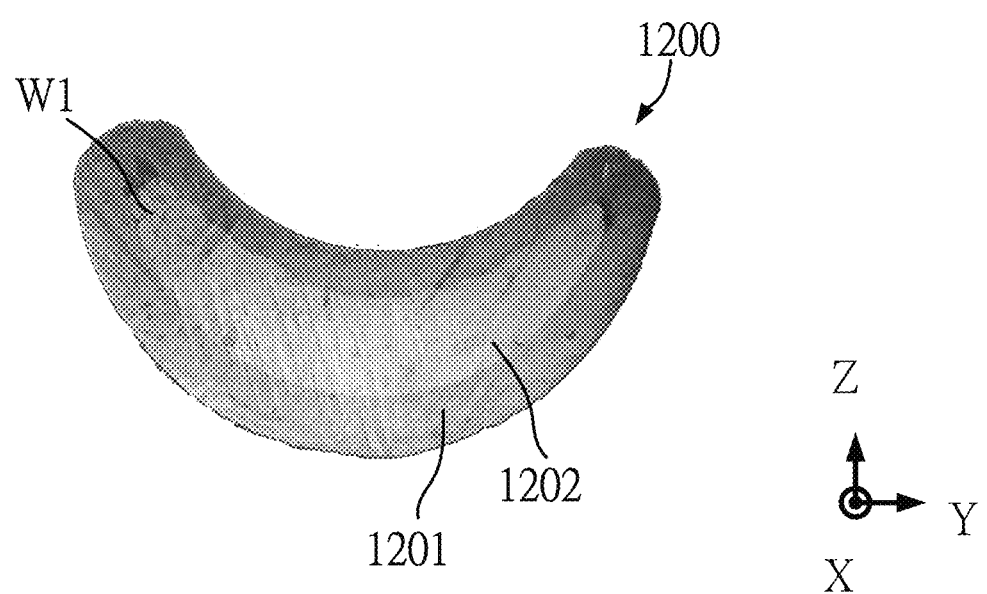
FIG. 8B is a sectional view of the crimping point of the crimping body on the first plane, after the thermo-crimping process using the apparatus in accordance with the present invention.

Eventually, please refer to FIG. 8A and FIG. 8B, wherein FIG. 8A and FIG. 8B respectively show the sectional views of the crimping point W1 of the crimping body W on the first plane crimped by using the conventional machine of the prior art or using the machine of the present invention. From the two figures, it is obvious that since there are more voids between the cable harness 1202 in the cable 1200, the crimping is not tight. In contrast, when the crimping processing is performed by the thermo-crimping process T of the present invention, there are fewer holes between the cable harness 1202 in the cable 1200, so the conductive wires can be tightly packed in the region enclosed by the cable harness 1202, and the shape of the cable 1200 is shaped as a whole C shape.

In general, the inductive thermo-crimping apparatus T of the present invention heats the crimping body W in a manner that doesn't need the upper electrode and lower electrode to contact the crimping body W. The crimping body W is heated by the electromagnetic induction which is generated by the current passed through the inductive heating coil 801. It prevents the crimping body W from contacting the inductive heating coil to reduce the damage of the energizing device. Through an appropriate magnetic circuit design, it allows the eddy current generated by the electromagnetic induction to flow uniformly through the crimping body W. Most importantly, the surface of the crimping body W and the outer insulating protection layer of the cable 1200 did not need to scrape off to increase the overall productivity of the pressing workpiece. Since the magnetic field can pass through the outer insulating protection layer of the cable 1200, the outer insulating protection layer and the heated residue affect the heating temperature slightly, so the effect of the outer insulating protection layer of the cable 1200 can be neglected. With the moveable and the rotatable punch 600, the pressing quality of the workpiece becomes better. The thermo-crimping apparatus T of the present invention is very competitive in the processing industry.

The above-described preferred embodiment of the present invention is not intended to limit the scope of the present invention. The above-described may be understood or implemented by persons skilled in the art. Therefore, other equivalent changes or modifications finished without departing from the spirit of the invention disclosed should be included within the scope of the present invention.

What is claimed is:

1. An inductive thermo-crimping apparatus, used for forming a rigid crimping body by using a thermo-crimping process to crimp a connecting body and a to-be-joined member, the inductive thermo-crimping apparatus comprises a driving part, a stamper part and a heating part, wherein the driving part is connected to the stamper part, the heating part is fixedly connected to the driving part, and the heating part is activated by electricity, characterized in that:

the heating part comprises an inductive heating coil, a concave mold and a magnetic conductive body, the inductive heating coil surrounds the concave mold, the magnetic conductive body is stacked on the inductive heating coil and closely attached to a sidewall of the concave mold which is surrounded by the inductive coil, and the magnetic conductive body is made of magnetic materials, the connecting body and the to-be-joined member are disposed on the concave mold and contacted each with the other, the inductive heating coil is activated electrically by alternating current to generate a magnetic field and to inductively to heat the connecting body and the to-be-joined member to make them soften and form a crimping body, wherein the driving part is provided for driving the stamper part to press the soften crimping body so that the connecting body is crimped to the to-be-joined member to form the rigid crimping body.

2. The inductive thermo-crimping apparatus of claim 1, wherein the driving part drives the stamper part to move toward a first direction, a second direction or a third direction, wherein the first direction, the second direction and the third direction are perpendicular to one another.

3. The inductive thermo-crimping apparatus of claim 2, wherein the stamper part includes a slide block, a punch fixation device, a punch and a guide rail, wherein the slide block is disposed in the guide rail, and the guide rail is disposed in parallel with the third direction, wherein the third direction is the Z axis direction of the Cartesian coordinate system.

4. The inductive thermo-crimping apparatus of claim 3, wherein the material of the punch is selected from a group consisting of copper alloy, stainless steel, ceramics or the combinations thereof.

5. The inductive thermo-crimping apparatus of claim 1, wherein the shape of the inductive heating coil based on a plane view is an arc or a saddle shape, and the plane view is Y-Z plane view of Cartesian coordinate system.

6. The inductive thermo-crimping apparatus of claim 1, wherein the inductive heating coil surrounds the concave mold on a plane, wherein the plane is X-Y plane of Cartesian coordinate system.

7. The inductive thermo-crimping apparatus of claim 1, wherein the inductive heating coil is a hollow hydro-cooling coil.

8. The inductive thermo-crimping apparatus of claim 1, wherein the connecting body is a cable.

9. The inductive thermo-crimping apparatus of claim 1, wherein the to-be-joined member is a wire nose.

10. An inductive thermo-crimping apparatus includes a driving part, a stamper part and a heating part, the driving part is connected to the stamper part, the heating part is fixedly connected to the driving part, and the heating part is activated by electricity, characterized in that:

the heating part comprises an inductive heating coil, a concave mold and a magnetic conductive body, the inductive heating coil surrounds the concave mold, and the inductive heating coil includes a U shaped portion whose opening area faces toward a second direction, a recess of the concave mold extends in a third direction, the U shaped portion surrounds a portion of the recess, whereby when an alternating current is applied for activating the inductive heating coil to let the alternating current pass through the inductive heating coil, the inductive heating coil and the alternating current forms a circuit loop electromagnetic field, wherein the magnetic conductive body is stacked on the inductive heating coil and closely attached to a sidewall of the concave mold which is surrounded by the inductive heating coil, and the magnetic conductive body is made of magnetic materials.

11. The inductive thermo-crimping apparatus of claim 10, wherein the driving part drives the stamper part to move toward a first direction, the second direction or the third direction, wherein the first direction, the second direction and the third direction are perpendicular to one another at a Cartesian coordinate system.

12. The inductive thermo-crimping apparatus according of claim 10, wherein the stamper part includes a slide block, a punch fixation device, a punch and a guide rail, wherein the slide block is disposed in the guide rail, and the guide rail is disposed in parallel with the third direction, wherein the third direction is the Z axis direction of the Cartesian coordinate system.

13. The inductive thermo-crimping apparatus of claim 12, wherein the material of the punch is selected from a group consisting of copper alloy, stainless steel, ceramics or the combinations thereof.

14. The inductive thermo-crimping apparatus of claim 10, wherein the shape of the inductive heating coil based on a plane view is an arc or a saddle shape, and the plane view is Y-Z plane view of Cartesian coordinate system.

15. The inductive thermo-crimping apparatus of claim 10, wherein the inductive heating coil surrounds the concave mold on a plane, wherein the plane is X-Y plane of Cartesian coordinate system.

16. The inductive thermo-crimping apparatus of claim 10, wherein the inductive heating coil is a hollow hydro-cooling coil.

17. The inductive thermo-crimping apparatus of claim 10, wherein the connecting body is a cable.

18. The inductive thermo-crimping apparatus of claim 10, wherein the to-be-joined member is a wire nose.

* * * * *